(12) United States Patent
Knutson

(10) Patent No.: US 7,034,666 B2
(45) Date of Patent: Apr. 25, 2006

(54) DEVICE USED TO AID IN THE LOADING AND UNLOADING OF VEHICLES AND IMPLEMENTS

(76) Inventor: Scott William Knutson, Rural Route 1, Box 65, Crookston, MN (US) 56716

( * ) Notice: Subject to any disclaimer, the term of this patent is extended or adjusted under 35 U.S.C. 154(b) by 231 days.

(21) Appl. No.: 10/081,848

(22) Filed: Feb. 20, 2002

(65) Prior Publication Data

US 2004/0004544 A1    Jan. 8, 2004

(51) Int. Cl.
*G08B 21/00* (2006.01)

(52) U.S. Cl. ............ 340/431; 340/679; 340/684; 340/691.1; 340/691.6; 340/693.1; 340/472; 340/474

(58) Field of Classification Search ........ 340/431, 340/679, 684, 691.1, 691.6, 693.1, 472, 474
See application file for complete search history.

(56) References Cited

U.S. PATENT DOCUMENTS

| | | | |
|---|---|---|---|
| 2,034,616 A | 3/1936 | Gossler | 250/2 |
| 3,866,169 A * | 2/1975 | Haglund | 340/901 |
| 3,944,972 A * | 3/1976 | Chandler | 340/425.5 |
| 4,483,683 A * | 11/1984 | Alley, Sr. | 441/69 |
| 4,689,611 A * | 8/1987 | Franklin | 340/539.26 |
| 4,797,671 A * | 1/1989 | Toal, Jr. | 340/825.49 |
| 4,831,539 A | 5/1989 | Hagenbuch | 364/449 |
| 5,068,654 A | 11/1991 | Husher | 340/903 |
| 5,108,123 A | 4/1992 | Rubenzik | 280/477 |
| 5,546,093 A | 8/1996 | Gudat et al. | 342/357 |
| 5,650,764 A | 7/1997 | McCullough | 340/431 |
| 5,861,814 A | 1/1999 | Clayton | 340/687 |
| 5,905,433 A | 5/1999 | Wortham | 340/431 |
| 5,978,720 A | 11/1999 | Hieronymus et al. | 701/29 |
| 6,100,795 A | 8/2000 | Otterbacher et al. | 340/431 |
| 6,208,259 B1 | 3/2001 | Lemke | 340/665 |
| 6,603,402 B1 * | 8/2003 | Lentine et al. | 340/573.6 |
| 2003/0146850 A1 * | 8/2003 | Fallenstein | 340/901 |

* cited by examiner

*Primary Examiner*—Tai T. Nguyen
(74) *Attorney, Agent, or Firm*—Curtis Harr

(57) ABSTRACT

A communication device is provided which is intended to aid farm workers in the coordination of harvesting and hauling vehicles in the field during crop harvesting operations. This communication device consists of a transmitter and receiver which are mounted at convenient points within the harvesting vehicle and produce hauling truck respectively. The receiver contains four lighted directional arrows representing directional changes of forwards, backwards, left, and right. The transmitter contains four buttons that correspond in location and function to the directional arrows on the receiver. Thus, when a button on the transmitter is depressed by the harvester operator, the corresponding directional arrow on the receiver will light up signaling the truck driver to make a change in the position of his truck relative to the harvester.

14 Claims, 6 Drawing Sheets

FIG 9
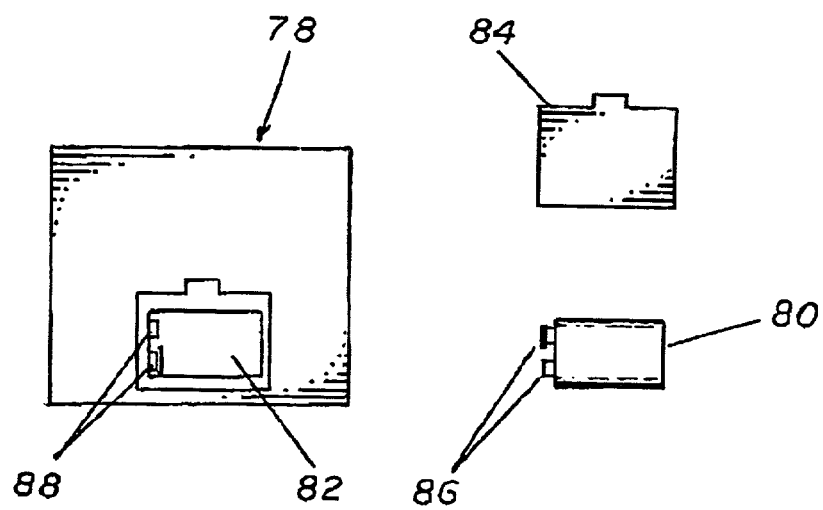
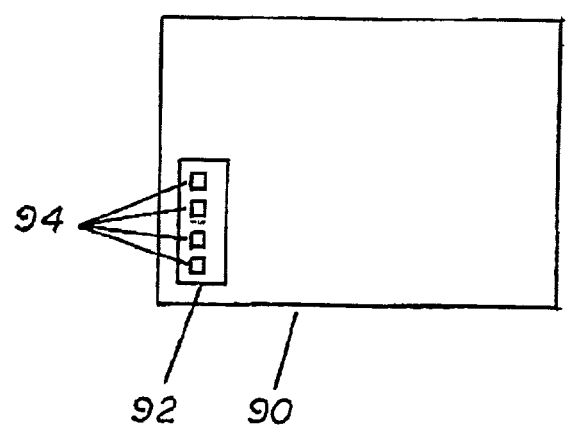
FIG 10

DEVICE USED TO AID IN THE LOADING AND UNLOADING OF VEHICLES AND IMPLEMENTS

BACKGROUND OF THE INVENTION

The present invention relates to an improvement in the methods used to control the position of a truck or grain cart in relation to a harvesting vehicle while the two are traveling next to one another while traveling along a parallel line. More specifically, to a method of communication between the driver of the harvesting vehicle and the truck which allows the harvester driver to position the truck in the proper location in relation to his harvester to allow him to fill the truck to its legal capacity.

During the harvesting of crops such as potatoes, sugar beets, and small grains (for the purposes of simplicity the remaining of this text will refer to the harvesting of potatoes although the methods described herein can be applied to any number of similar processes such as the loading of rail cars and mining equipment), a harvesting vehicle such as a combine or a tractor pulled digger typically contains a tank for the storage of potatoes. When this holding tank reaches its holding capacity it is necessary to offload it into the box of a transport truck so that the harvesting vehicle can return to its job of harvesting the crop. Additionally, the noise generated by the harvesting equipment can interfere with the communication between the driver of the harvester and the load truck making operations more difficult.

As farming operations have become more efficient, it has become necessary to offload the holding tanks on the run. This means that while the harvester continues moving along the field, the holding tank is offloaded via an auger or conveyor device into the box of a truck that is traveling along side it. In performing this operation, the truck must maintain a specific position underneath the conveyor. The difficulty encountered in this operation is that the driver of the truck is unable to directly see the position of the truck box in relation to the conveyor. Additionally, it is often necessary for the truck driver to reposition the truck both side to side and backwards and forwards in relation to the conveyor to ensure that the truck box is filled to its capacity.

In the past, the person controlling the unloading process from the harvester would communicate with the truck driver by radio and instruct him to move to reposition his truck in relation to the conveyor to ensure the box was filled to capacity. While this system functions satisfactorily when there is only one harvester/truck combination working a field, the reality of modern farming operations is that there is almost always a plurality of such combinations working the same field during harvest operations. This situation is problematic as all the vehicles use the same radio frequency leading to confusion amongst the numerous operators.

From this discussion it can be seen that it would be advantageous to provides a means by which the operator of a harvesting vehicle could communicate solely with the driver of the truck with which he is working to control the location of the truck with respect to the offloading conveyor.

SUMMARY OF THE INVENTION

It is the primary objective of the present invention to provide a method by which an operator of a harvesting vehicle can communicate with the driver of a truck into which a harvested crop is being offloaded in order to control the truck's position in relation to the harvester and its offloading conveyor.

It is an additional objective of the present invention to provide such a method of controlling the position of a truck in relation to a harvesting vehicle which will eliminate the potential from interference in their communications from other similar vehicle tandems operating in close proximity, thereby eliminating the potential for operator confusion resulting from such interferences.

It is a further objective of the present invention to provide such a method of controlling the position of a truck in relation to a harvesting vehicle that effectively accomplishes this purpose in an inexpensive manner that can be operated by a wide range of individuals in a wide range of conditions.

These objectives are accomplished by the use of a transmitter and receiver which are mounted at convenient points within the harvesting vehicle and truck respectively. The receiver is typically mounted in the cab of the truck within the normal field of view of the driver and contains four lighted directional arrows representing directional changes of forward, backward, left, and right. The transmitter is typically mounted in the harvesting vehicle within easy reach of the operator and contains four buttons that correspond in location and function to the directional arrows on the receiver. Thus, when a button on the transmitter is depressed by the harvester operator, the corresponding directional arrow on the receiver will light up signaling the truck driver to make a change in the position of his truck relative to the harvester. Also, the system can be configured in a manner so that the directional lights are only lit when the corresponding directional button is depressed, or to stay on for a specified length of time after the directional button has been released.

Additionally, the transmitter may be equipped with an optional buzzer button which is used to engage a buzzer located on the receiver and employed to alert the truck driver. The buzzer may also be configured in a manner so that it may be activated by the operation of the directional buttons located on the transmitter. The use of this configuration means that the buzzer will alert on the activation of any of the buttons on the transmitter ensuring that the truck diver will be alerted to the request for a change in his orientation.

The transmitters used by the present invention will have a relatively short range, much like those commonly used for garage door openers, or more specifically an operational maximum of from 500 to 1000 feet. The present invention also makes use of a pair of dip switches located both in the transmitter and receiver. The dip switches allow the user to control the manner in which the transmitter encodes the signal inputs from the directional buttons and the manner in which the receiver decodes the signal before activating the directional arrows. This feature allows for the use of a number of individual units using the same frequency to operate in close quarters by providing a means by which the signals from one such unit will not interfere with the receivers of another. The use of these types of transmitters ensures that separate harvesting tandems operating in the same field will not interfere with the transmissions of the others. Thus, the use of the present invention eliminates the confusion caused by the prior use of the two way radio systems allowing the operators of harvesters to freely communicate with the truck drivers providing a more efficient means by which the harvesting process can be accomplished.

Finally, The transmitter and receiver of the present invention can also be constructed so that they use a battery system to provide their operational electrical needs. The use of a battery as an energy source enables the present invention to be more versatile in the manner in which it is deployed for its intended uses. Thus, the battery powered transmitters and receivers can be used in vehicles that do not have supplemental electrical outlets such as cigarette lighters allowing for its use in a greater variety of vehicles.

For a better understanding of the present invention reference should be made to the drawings and the description in which there are illustrated and described preferred embodiments of the present invention.

DESCRIPTION OF THE DRAWINGS

FIG. 9 is a rear elevation view of the back of the transmitter or receiver components of the present invention illustrating an alternative embodiment of the invention which makes use of an electrical battery to provide its operational energy requirements.

FIG. 10 is a front elevation view of a typical circuit board that is used in the transmitter and receiver components of the present invention and that contain a dip switch component which provide a mechanism by which the user can vary how the transmitter and receiver encode and decode the the signals passing between the two.

DESCRIPTION OF THE PREFERRED EMBODIMENT

Figure 1:
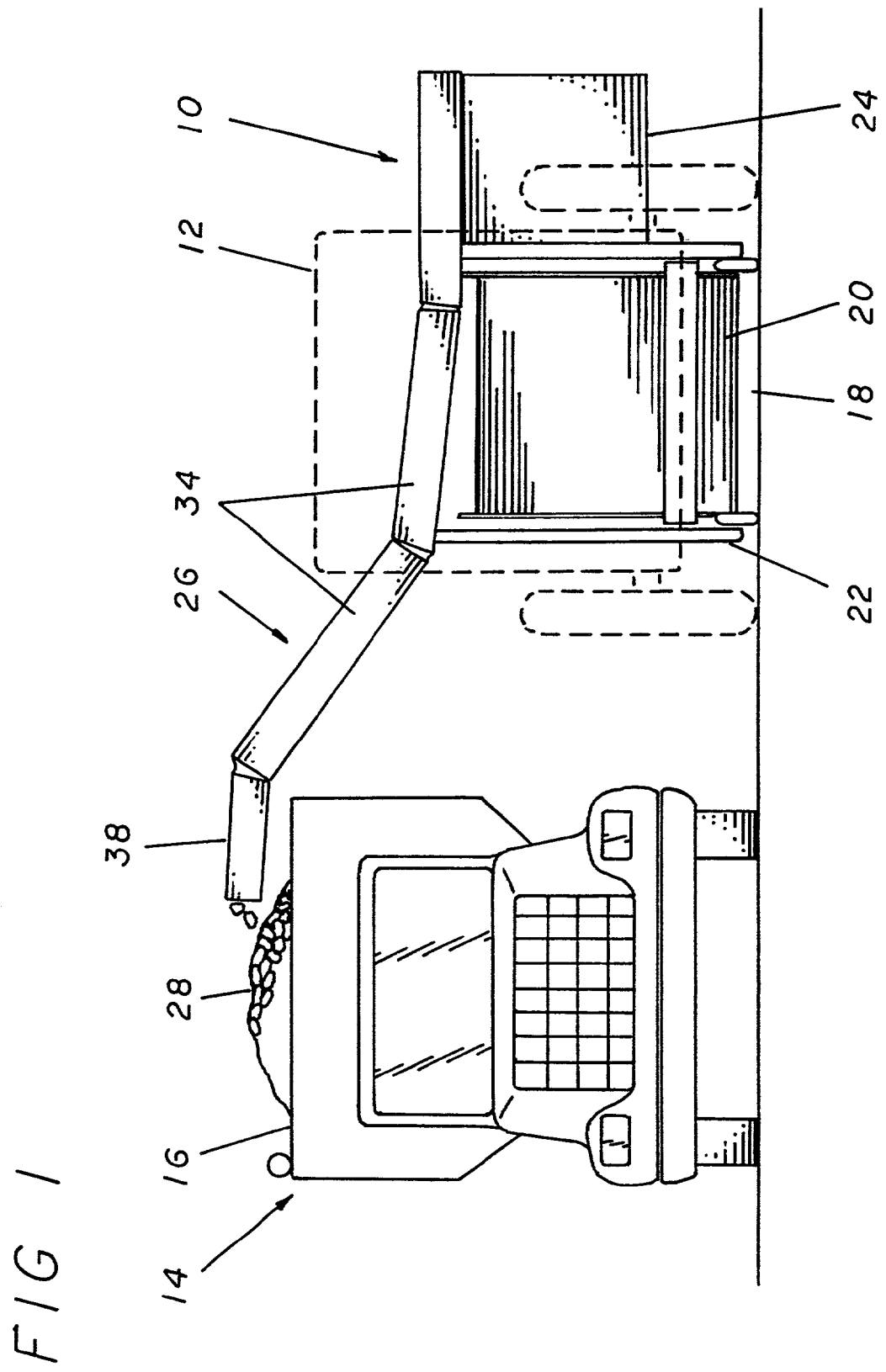
FIG. 1 is a front elevation view of a typical potato harvester being used in conjunction with a typical farm truck which is being used to carry the harvested potatoes that are being offloaded from the harvester.
Figure 2:
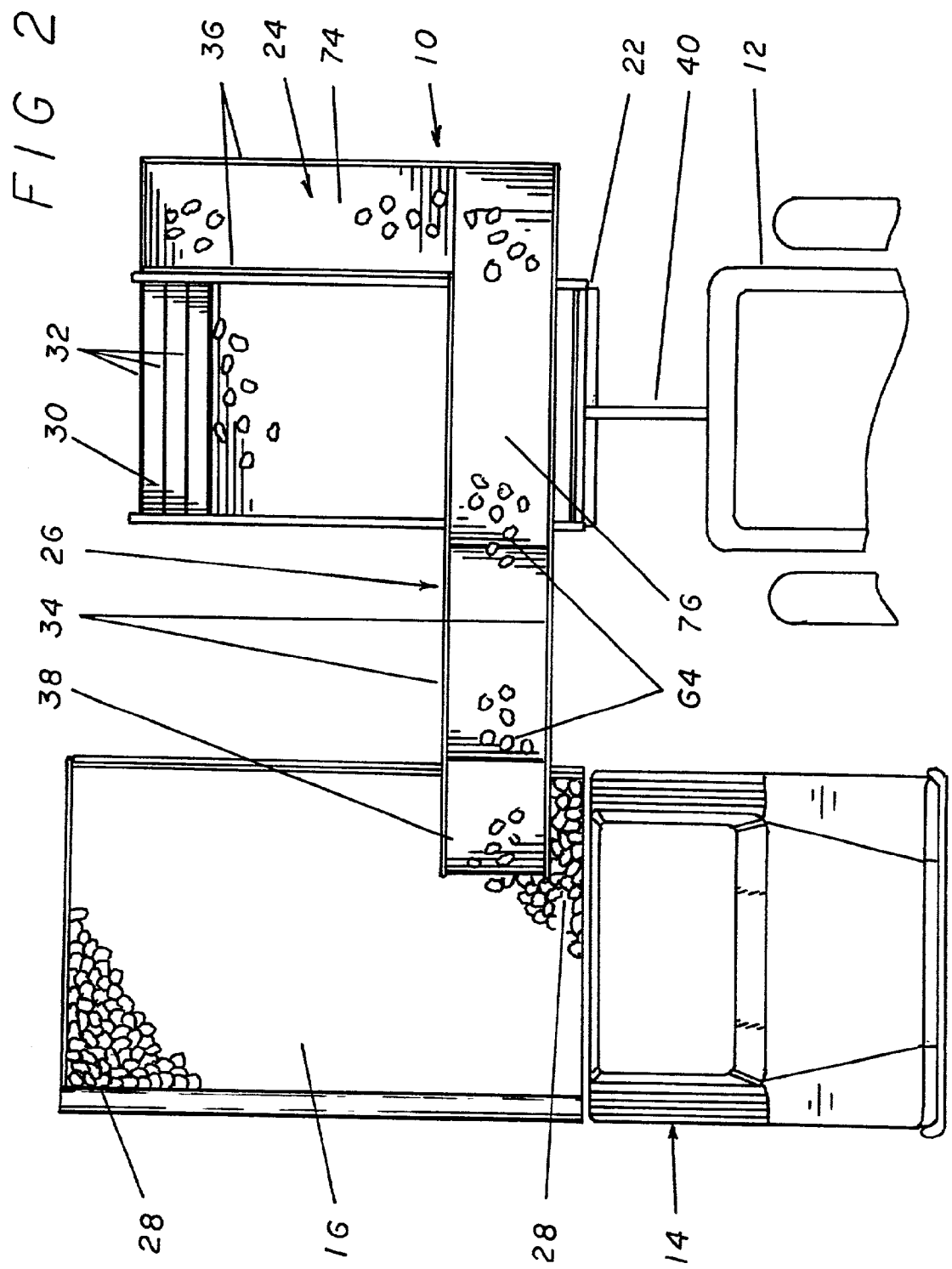
FIG. 2 is a top elevation view of the harvester and farm truck of FIG. 1 and further illustrates the manner in which the potatoes are moved via the conveyor from the harvester to the farm truck.

Referring now to the drawings, and more specifically to FIGS. 1 and 2, the present invention is used in a typical potato harvesting situation where a harvester 10 is used to dig potatoes from a field which then are transferred to the box 16 of a truck 14 driving next to it in the field. In this manner of use, the harvester 10 is typically drawn behind a towing vehicle 12 such as an all purpose farm tractor. The connection between these two vehicles employs a typical trailer configuration facilitated primarily by the use of a trailer tongue 40 connected through a hitch to the harvester frame 22. The harvester frame 22 is also the component of the harvester 10 upon which its remaining components are built.

The harvester 10 itself makes use of a digger blade 18 which penetrates the surface of the field to a specified depth and removes all of the potatoes 64 contained within that specified depth. From this point, the potatoes 64 are carried up the primary conveyor 20 at the end of which they are dropped through the vine remover 32. The vine remover 32 is essentially a series of parallel spaced bars which remove the upper portions and vines of the potato plant from the potatoes 64. After passing through the vine remover 32, they pass onto the secondary conveyor 30 which moves the potatoes 64 from their point of deposition to the side conveyor 24.

The side conveyor 24 is essentially an elongated box made up of two parallel side conveyor frames 36 within which runs the side conveyor belt 74. The side conveyor belt 74 transports the deposited potatoes 64 forward and upward to its terminus where they are dumped on the lower end of the conveyor boom 26. The boom conveyor 26 is constructed in a similar fashion as the side conveyor 24 having a pair of parallel boom conveyor frames 34 and a centrally located rotating boom conveyor belt 76. The boom conveyor 26 differs however in the fact that it is articulated and pivotally mounted at its base which allows it to be raised and lowered as needed to facilitate the loading process. The boom conveyor 26 terminates at the dump boom 38 which is the articulating tip of the boom conveyor 26 and is used to direct the potatoes 64 into the truck box 16 in order to ensure that the load 28 is properly positioned so that the truck 14 can carry its legal capacity.

The present invention is a device that is employed by the operators of the harvesters 10 and their related trucks 14 to control the orientation of the truck 14 in relation to the harvester 10 generally, and of the truck's box 16 to the dump boom 38 specifically. This control function is accomplished by the present invention through the use of a transmitter 56 and a receiver 42. The transmitter 56 is located in a position within the harvester 10 or towing vehicle 12 in a location that a person (most commonly the towing vehicle 12 operator) in a position to monitor the orientation of the truck 14 can easily reach and operate it. A common place of attachment for the transmitter box 56 is on the towing vehicle' dashboard 62 as illustrated in FIG. 4.

The transmitter 56 is equipped with four directional buttons 60 located symmetrically on its face. The operator employs the transmitter 56 by depressing one of its directional buttons 60 which corresponds in location to the direction he wants the truck driver to move. The directional buttons 60 (as well as the directional arrows 44 discussed below) generally illustrate devices that convey an instruction to change ones relative position in a forward, rearward, leftward, or rightward manner. The transmitter 56 then sends this signal to the receiver 42 located in the truck 14.

Figure 4:
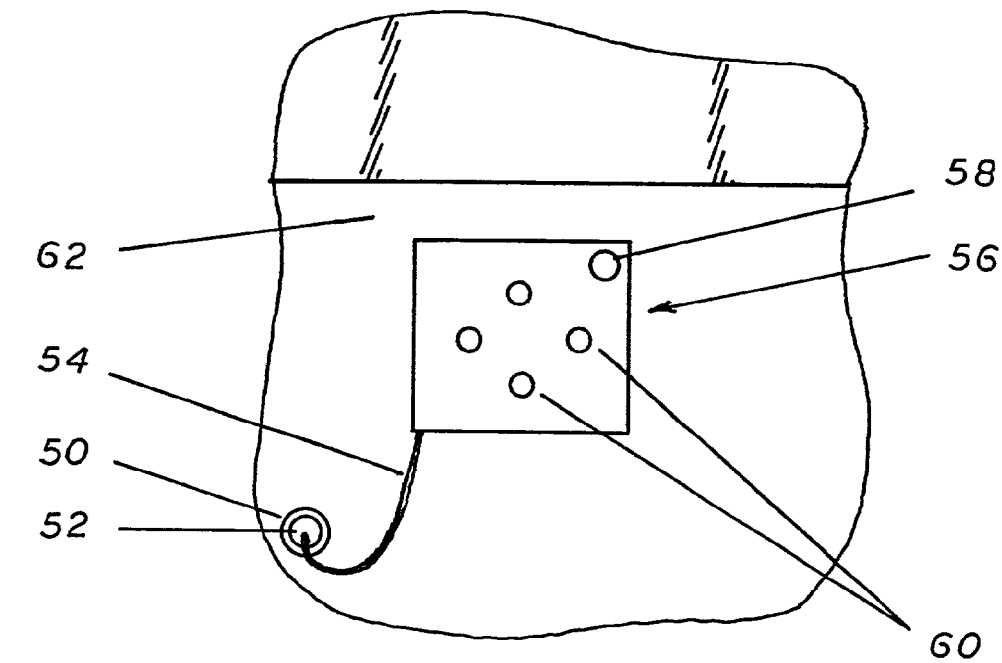
FIG. 4 is a front elevation view of the transmitter component of the present invention illustrating its general configuration and the manner in which it may be powered by a connection with a cigarette lighter.

The receiver 42 is generally located on the truck's dashboard 48 (as illustrated in FIG. 4) and is equipped with four directional arrows 44 located in its face and corresponding in location to the direction buttons 60 of the transmitter box 56. The directional arrows 44 are constructed in a manner by which they can be independently illuminated by the application of an electrical current. This current is supplied by the operation of the directional buttons 60 as described above. Thus, the use of the present invention allows the operator of the towing vehicle 12 to communicate his needs to the truck driver by engaging a specific directional button 60 which in turn is transmitted to the receiver 42 which illuminates the corresponding directional arrow 44. This in turn directs the truck driver to reposition the truck 14 to the position that corresponds to the position indicated by the towing vehicle 12 operator.

Additionally, the transmitter 56 and receiver 42 contain a circuit board 90 (as illustrated in FIG. 10) which has as one of its components a dip switch 92. The dip switch 92 is a mechanism which provides the user of the present invention with a method of altering the way the transmitter 56 and receiver 42 encode and decode the signals that they are sending and receiving from each other during operations. This means that individual units of the present invention can operate on the same frequency in close proximity of one another without interfering with the specific instructions being sent between a linked transmitter 56 and receiver 42. The dip switch 92 is made up of a series of dip switch pins 94 that are capable of being set in either an up or down position. In an operational pair of transmitters 56 and receivers 42, these dip switch pins 94 are set in the exact same sequence of up and down positions. The position of these dip switch pins 94 controls the manner of encoding and decoding which allows for the individualization of each operational pair's signaling function. Thus, the use of the dip switch 92 provides a means by which a plurality of the present invention's transmitters 56 and receivers 42 can be used in close proximity without interfering with each others communications.

The electrical power necessary to operate the transmitter and receiver, 56 and 42, is supplied through the existing electrical systems of the towing vehicle 12 and truck 14 respectively. This is accomplished by the use of a cigarette lighter adapter 52 which is connected on the trailing end of a lead wire 54 which is in turn connected at its other end to either the transmitter and receiver, 56 and 42. The cigarette lighter adapter 52 is plugged into an existing cigarette lighter plug 50 located in the truck or towing vehicle dashboard, 48 and 62, which provides the electricity necessary to transmit the signals or to illuminate the directional arrows 44 necessary for the operation of the invention.

A alternative embodiment of the present invention is illustrated in FIG. 9 which employs a battery 80 as an electrical source as opposed to the method described above. With the use of a battery 80 as an electrical source, the back of the transmitter/receiver 78 is equipped with a battery cavity 82 into which a battery 80 is positioned. The battery 80 is typically equipped with battery contacts 86 which match in their method of construction and relative position to the cavity contacts 88 located in the battery cavity 82. Thus, the installation of the battery 80 in the battery cavity 82 connects the battery contacts 86 with the cavity contacts 88 which completes an electrical circuit and provides the invention with the electrical current stored within the battery 80. The battery cavity 82 is also equipped with a cavity door 84 which isolates the contained components from outside influences.

Figure 3:
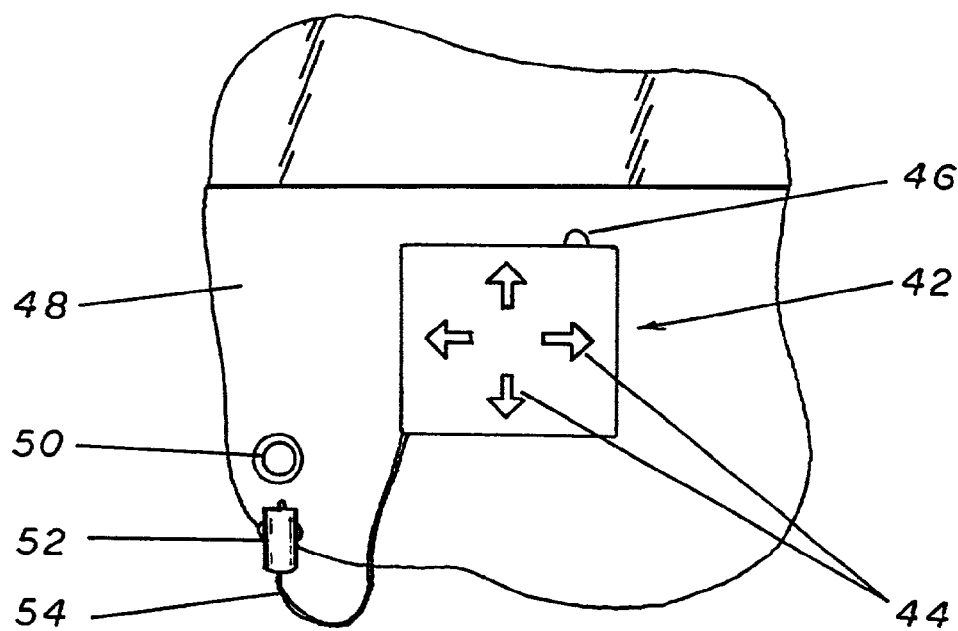
FIG. 3 is a front elevation view of the receiver component of the present invention illustrating its general configuration and the manner in which it may be powered by a connection with a cigarette lighter.

FIGS. 3 and 4 also illustrate the use of the optional buzzer 46, located on the face of the receiver box 42, and the corresponding buzzer button 58 located on the edge of the transmitter 56. The purpose of the buzzer 46 and buzzer button 58 is to provide an audible method of alerting the truck driver to any necessary positional changes or other actions that may be required from him. The buzzer 46 can also be configured in such a fashion so that it is connected in circuit with all of the directional arrows 44. This means that the depression of a specific directional button 60 on the transmitter 56 will not only illuminate the corresponding directional arrow 44, but also activate the buzzer 46. The use of this duel alert system ensures that the truck driver's attention will be gained at the appropriate times and that the harvesting operation will run as smoothly as possible.

Figure 5:
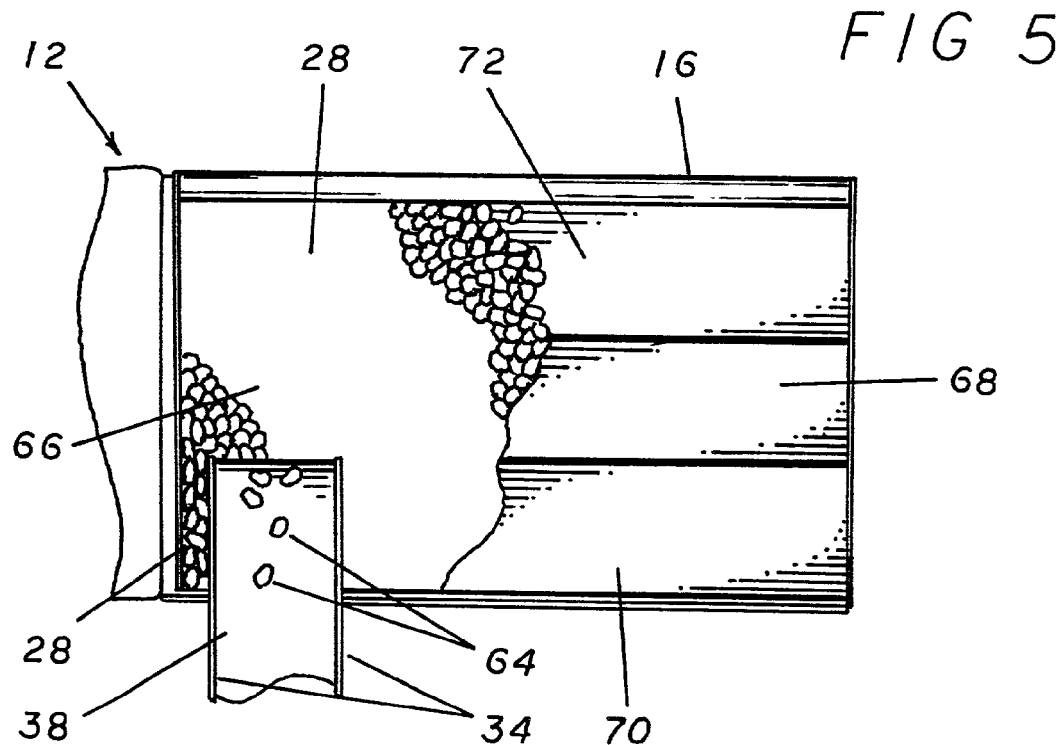
FIG. 5 is a top elevation view of a typical truck box illustrating the manner in which the harvester's conveyor is used to begin filling a specific portion (in this illustration the forward end) of the truck box.

The operation of the present invention in controlling the orientation of the truck 14 in relation to the dump boom 38 is further illustrated in FIGS. 5, 6, 7, and 8. FIG. 5 illustrates the truck 14 being positioned so that the dump boom 38 oriented towards the most forward end of the truck box 16, therefore, positioning the load 28 in the front quadrant 66. This position of the dump boom 38 is thus maintained until the operator is satisfied that the front quadrant 66 is properly filled before moving on to fill the remaining portions of the truck box 16.

Figure 6:
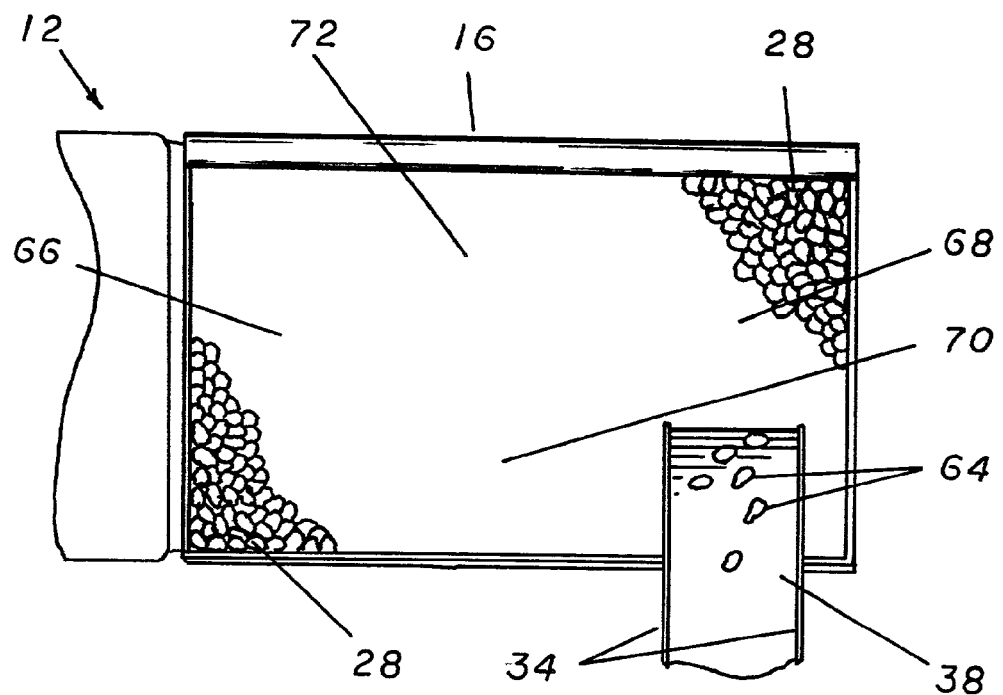
FIG. 6 is a top elevation view of the truck box of FIG. 5 and illustrates how the change of orientation between the truck and the harvester allows the conveyor to be used to fill the rear portion of the truck box.

FIG. 6 illustrates the truck 14 moving forward in terms of its orientation to the dump boom 38 which has the effect of positioning the dump boom 38 in the rear quadrant 68 of the truck box 16. Thus, any potatoes 64 traveling down the boom conveyor belt 76 will be deposited in this portion of the truck box 16 thereby evening out the load 28 that was deposited in the front quadrant 66 in the previous phase. The illumination of the forward and rearward directional arrows 44 controls this positioning of the dump boom 38 relative to the truck box 16 and provides for its efficient filling in terms of its front and rear quadrants, 66 and 68.

Figure 7:
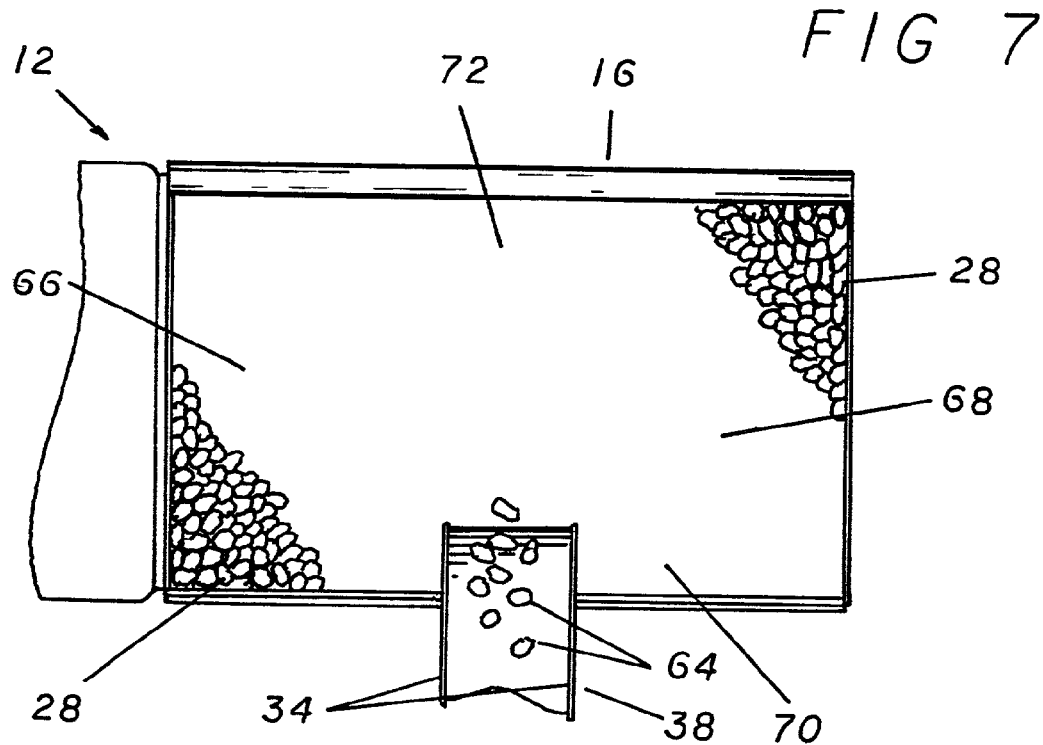
FIG. 7 is a top elevation view of the truck box of FIG. 5 and illustrates how the change of orientation between the truck and the harvester allows the conveyor to be used to fill the inside edge of the truck box.
Figure 8:
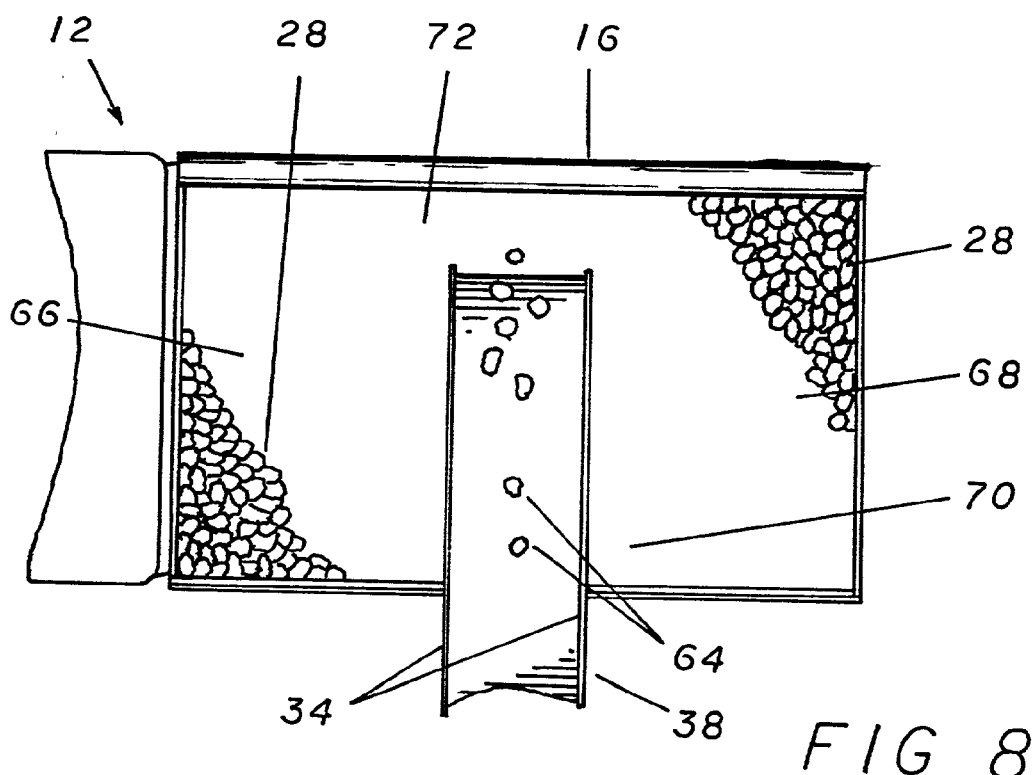
FIG. 8 is a top elevation view of the truck box of FIG. 5 and illustrates how the change of orientation between the truck and the harvester allows the conveyor to be used to fill the outside edge of the truck box.

FIGS. 7 and 8 illustrate the manner in which the present invention is employed to change the orientation of the truck box 16 from side to side. This side to side movement has the effect of positioning the dump boom 38 in the inside quadrant 70 with the truck 14 moving away from the harvester 10, allowing the controller to properly fill in the inside quadrant 70 of the truck box 16, or positioning the dump boom 38 in the outside quadrant 72 with the truck 14 moving towards the harvester 10, allowing the inside quadrant 70 to be filled. Therefore, the use of the present invention allows its users to position the truck box 16 in the above described orientations (including all possible intermediate positions) to position the load 28 within the truck box 16 in a manner that ensures that it is filled to its designed capacity.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A device used to aid in the loading and unloading of vehicles or implements said device comprising:
    a wireless transmitter unit having an upper surface and a lower surface said upper surface having a forward, a backward, a left and a right directional button, said lower surface having a cavity access door, said wireless transmitter unit further having a transmitter power supply;
    a wireless receiver unit having an upper surface and a lower surface said upper surface having a forward, a backward, a left and a right directional indicator, said lower surface having a cavity access door, said wireless receiver unit further having a receiver power supply such that when a directional button on said transmitter is activated the corresponding receiver directional indicator is activated;
    a transmitter dip switch for encoding a signal on said transmitter and a receiver dip switch for decoding said signal on said receiver; and said transmitter and receiver having a maximum effective range of less than 1000 feet so as to limit interference.

2. A device used to aid in the loading and unloading of vehicles or implements as in claim 1 wherein said directional indicators are lights.

3. A device used to aid in the loading and unloading of vehicles or implements as in claim 2 wherein said transmitter power supply and said receiver power supply is a battery contained in said transmitter and said receiver behind said cavity access door.

4. A device used to aid in the loading and unloading of vehicles or implements as in claim 3 wherein said transmitter power supply and said receiver power supply is a cigarette lighter plug for attachment to said vehicle or implement.

5. A device used to aid in the loading and unloading of vehicles or implements said device comprising:
   a wireless transmitter unit having an upper surface and a lower surface said upper surface having a forward, a backward, a left and a right directional button, said lower surface having a cavity access door, said wireless transmitter unit further having a transmitter power supply;
   a wireless receiver unit having an upper surface and a lower surface said upper surface having a forward, a backward, a left and a right directional indicator, an audible indicator, said lower surface having a cavity access door, said wireless receiver unit further having a receiver power supply such that when a directional button on said transmitter is activated the corresponding receiver directional indicator is activated and said audible indicator is sounded;
   a transmitter dip switch for encoding a signal on said transmitter and a receiver dip switch for decoding said signal on said receiver; and
   said transmitter and receiver having a maximum effective range of less than 1000 feet so as to limit interference.

6. A device used to aid in the loading and unloading of vehicles or implements as in claim 5 wherein said directional indicators are lights.

7. A device used to aid in the loading and unloading of vehicles or implements as in claim 6 wherein said transmitter power supply and said receiver power supply is a battery contained in said transmitter and said receiver behind said cavity access door.

8. A device used to aid in the loading and unloading of vehicles or implements as in claim 7 wherein said transmitter power supply and said receiver power supply is a cigarette lighter plug for attachment to said vehicle or implement.

9. A device used to aid in the loading and unloading of vehicles or implements said device comprising:
   a wireless transmitter unit having an upper surface and a lower surface said upper surface having a forward, a backward, a left and a right directional button, an audible indicator button, said lower surface having a cavity access door, said wireless transmitter unit further having a transmitter power supply;
   a wireless receiver unit having an upper surface and a lower surface said upper surface having a forward, a backward, a left and a right directional indicator, an audible indicator, said lower surface having a cavity access door, said wireless receiver unit further having a receiver power supply such that when a directional button on said transmitter is activated the corresponding receiver directional indicator is activated and when said audible indicator button is activated said audible indicator is sounded;
   a transmitter dip switch for encoding a signal on said transmitter and a receiver dip switch for decoding said signal on said receiver; and
   said transmitter and receiver having a maximum effective range of less than 1000 feet so as to limit interference.

10. A device used to aid in the loading and unloading of vehicles or implements as in claim 9 wherein said directional indicators are lights.

11. A device used to aid in the loading and unloading of vehicles or implements as in claim 10 wherein said transmitter power supply and said receiver power supply is a batter contained in said transmitter and said receiver behind said cavity access door.

12. A device used to aid in the loading and unloading of vehicles or implements as in claim 11 wherein said transmitter power supply and said receiver power supply is a cigarette lighter plug for attachment to said vehicle or implement.

13. A method for telling a driver of a first vehicle how to position said first vehicle by the driver of a second vehicle as said second vehicle unloads its contents into said first vehicle comprising the steps of:
   supplying said first vehicle with a wireless receiver unit having an upper surface and a lower surface said upper surface having a forward, a backward, a left and a right directional indicator, said lower surface having a cavity access door, said wireless receiver unit further have a dip switch for decoding a signal;
   connecting said wireless receiver to a power supply;
   supplying said second vehicle with a wireless transmitter unit having an upper surface and a lower surface said upper surface having a forward, a backward, a left and a right directional button, said lower surface having a cavity access door, said wireless transmitter unit further have a dip switch for encoding a signal;
   connecting said wireless transmitter to a power supply;
   setting said receiver and said transmitter dip switches to duplicate settings;
   activating the appropriate button on said transmitter thereby activating the corresponding directional indicator of said receiver; and
   limiting the maximum effective range of said transmitter and said receiver to less than 1000 feet so as to limit interference.

14. A method for telling a driver of a first vehicle how to position said first vehicle by the driver of a second vehicle as said second vehicle unloads its contents into said first vehicle as in claim 13 further comprising the steps of:
   supplying said wireless receiver with an audible indicator; and
   sounding said audible indicator so as to alert said first driver that a directional indicator is activated and appropriate action is necessary.

* * * * *